(12) United States Patent
Bansal

(10) Patent No.: US 6,788,949 B1
(45) Date of Patent: Sep. 7, 2004

(54) METHOD AND SYSTEM FOR TRANSFER OF MOBILE CHAT SESSIONS

(75) Inventor: Pradeep K Bansal, Dayton, NJ (US)

(73) Assignee: AT&T Corp., New York, NY (US)

( * ) Notice: Subject to any disclaimer, the term of this patent is extended or adjusted under 35 U.S.C. 154(b) by 755 days.

(21) Appl. No.: 09/666,565

(22) Filed: Sep. 21, 2000

(51) Int. Cl.[7] .................................................. H04M 3/42
(52) U.S. Cl. .................. 455/519; 455/414.2; 455/456.3
(58) Field of Search ................................ 455/578, 519, 455/414.1, 414.2, 414.3, 432.1, 435.1, 436, 438, 456.3, 456.2, 456.1; 709/219, 223, 225, 227

(56) References Cited

U.S. PATENT DOCUMENTS

| | | | |
|---|---|---|---|
| 5,963,217 A | 10/1999 | Grayson et al. | |
| 6,256,498 B1 * | 7/2001 | Ludwig | 455/433 |
| 6,332,127 B1 | 12/2001 | Bandera et al. | |
| 6,442,590 B1 * | 8/2002 | Inala et al. | 709/204 |
| 6,504,920 B1 | 1/2003 | Okon et al. | |
| 6,510,324 B2 | 1/2003 | Fukumura | |
| 6,522,886 B1 | 2/2003 | Youngs et al. | |
| 6,539,421 B1 | 3/2003 | Appelman et al. | |
| 6,549,768 B1 * | 4/2003 | Fraccaroli | 455/456.3 |
| 6,629,136 B1 * | 9/2003 | Naidoo | 709/219 |

* cited by examiner

Primary Examiner—Nick Corsaro
(74) Attorney, Agent, or Firm—Michael Haynes PLC

(57) ABSTRACT

At least one method is disclosed for transferring a chat session involving a mobile information device from a first chat server to a second chat server. The method includes receiving at the second chat server a transfer request. The method also includes establishing connectivity between the mobile information device and the second chat server, and releasing connectivity between the mobile information device and the first chat server.

27 Claims, 5 Drawing Sheets

METHOD AND SYSTEM FOR TRANSFER OF MOBILE CHAT SESSIONS

CROSS-REFERENCE TO RELATED APPLICATION

This invention relates to the following co-pending application, which is incorporated by reference in its entirety:

"Method and System for Mobile Chat Sessions", Ser. No. 09/666,564, filed 21 Sep. 2000.

FIELD OF THE INVENTION

The present invention relates to the field of chat sessions, and, more particularly, to a method and system for mobile chat sessions.

BACKGROUND OF THE INVENTION

The development of the Internet has created numerous communications advances. One of these advances, called Internet Relay Chat ("IRC") has enabled "chat sessions" that can occur between two or more participants. Each participant in a chat session is allowed to enter and send messages simultaneously, typically via typing. Sent messages are usually perceivable by each chat session participant, typically by viewing on a computer monitor.

A computer software program called a chat client allows one to access a chat session operating on a chat server running across a chat network. Other software allows chat sessions to be accessed with a Web browser. Still other software, such as Microsoft's NetMeeting, provides text and voice chat, whiteboard, application sharing, and full-fledged video-conferencing.

Chat sessions that are open for anyone to join are typically called "chat rooms" or "chat groups". Chat can also be implemented in a private, one-on-one manner. This type of chat is typically referred to as "instant messaging", because of its reputation for real-time communication. As used herein, the terms "chat" and "instant messaging" are used synonymously. ICQ and AOL's Instant Messenger are two examples of products that offer instant messaging. Some instant messaging products allow a user to specify a list of others (called, e.g., a "buddy list") with whom the user might want to communicate, such that the product can notify the user when one of those on the list is on-line and operating the product, and thus available for messaging. Another popular feature of instant messaging products, called "ActiveLists" by ICQ, allows users to find others interested in the same topic.

Despite its rapidly growing popularity, chat has thus far not been focused on serving the needs of mobile users, such as automobile drivers, event spectators, shoppers, and the like. Such users often desire to chat about location-dependent issues that are related to a relatively small geographical area. Moreover, the geographical area of interest to a particular user might change as the user moves from one geographical area to another.

SUMMARY OF THE INVENTION

Embodiments of the present invention provide a method for transferring a chat session involving a mobile information device from a first chat server to a second chat server. The method includes receiving at the second chat server a transfer request. The method also includes establishing connectivity between the mobile information device and the second chat server, and releasing connectivity between the mobile information device and the first chat server.

BRIEF DESCRIPTION OF THE DRAWINGS

The invention will be more readily understood through the following detailed description, with reference to the accompanying drawings, in which.

DETAILED DESCRIPTION

Embodiments of the present invention provide a method for a mobile information device to participate in a chat group. The method includes detecting a mobile information device in a first chat server's geographical area. The method also includes determining if the mobile information device is associated with a chat group hosted by the first chat server and providing connectivity between the mobile information device and the chat group.

Method 100

Figure 1:
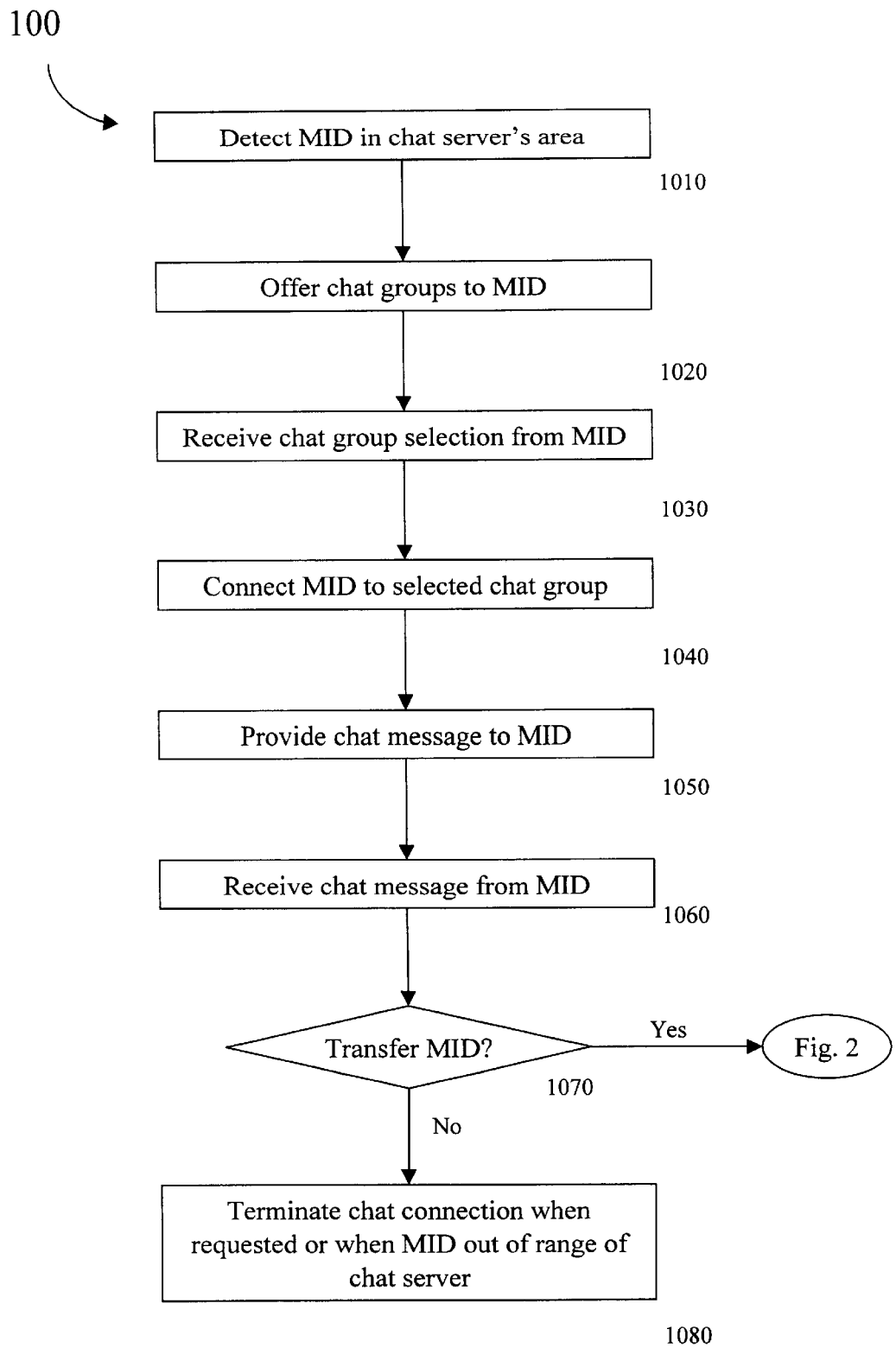
FIG. 1 is a flowchart of an exemplary embodiment of a method 100 of the present invention.

FIG. 1 is a flowchart of an exemplary embodiment of a method 100 of the present invention. Method 100 can begin at activity 1010, wherein a mobile information device ("MID") is detected in a chat server's geographical area. This location detection can occur using any of many well known techniques and/or technologies, such as for example, power attenuation, angle of arrival, time difference of arrival, triangulation, trilateration, dead reckoning, odometrics, radio beacons, GPS, Loran, infrared beacons, proximity beacons, roadside readers, the Federal Communications Commission's Enhanced 911 initiative, etc. Other examples and discussions of these and/or other potentially applicable technologies are provided in U.S. Pat. Nos. 6,122,527 (Robinson), 6,119,012 (Amirijoo), 6,115,754 (Landgren), 6,075,993 (Kawamoto), 5,914,675 (Tognazzini), 5,712,899 (Pace), 5,666,662 (Shibuya), 5,486,822 (Tenmoku), 5,223,844 (Mansell), 5,055,851 (Sheffer), and 4,654,879 (Goldman), each of which is incorporated herein in its entirety.

At step 1020, the chat server can provide to the mobile user a list or identification of chat groups that are hosted and/or served by the chat server. This provision can be automatic or can be contingent upon the mobile user or MID requesting the list or identity of the chat groups. Chat groups of particular interest to a mobile user can include those related to a particular geographic area, for example, an entertainment and/or cultural facility such as an arena, stadium, museum, concert hall, park, or monument; a commercial venue such as an office building, shopping mall, hotel, or convention center; a transportation station, such as an airport, harbor, or train station; a section of an Interstate highway or other thoroughfare; an educational and/or research setting, such as a campus, school, classroom, or laboratory; and/or an industrial area such as an industrial park, plant, or facility.

The chat server can provide a list of available chat groups from a chat group database that is coupled, either directly or indirectly across a network, to the chat server. The chat group database can include an identity of each chat group, the scope of that chat group's discussions, the geographic range within which that group is available, any costs or other requirements associated with participating in the group, and/or any group-specific rules for group participants. The chat group database can be dedicated to a specific chat server or can be shared among many chat servers.

For example, one of the available chat groups could be a free chat group called "I-495-VA" that is dedicated to chat involving the Virginia portion of the Interstate 495 Beltway that circles Washington, D.C. Such a chat group could include discussions of traffic congestion, accidents, road hazards, aggressive drivers, carpools, navigational directions, etc. The chat group could be rule-free, or could, for example, prohibit chat behaviors such as profanity or flaming, i.e., overly critical or offensive messages.

In some embodiments, the chat server can utilize the database to identify chat groups available on that chat server. In other embodiments, the chat server can utilize the database to identify chat groups whose predefined range includes a current and/or anticipated location of the MID. In still other embodiments, the chat server can utilize the database to filter the available chat groups based on one or more predetermined criteria, such as chat group membership, chat group topic, and/or chat group geographic area, etc. These criteria can be provided by the MID or by the chat server. Moreover, the chat server can select which chat groups it presents as available based on the one or more predetermined criteria. Further, the chat server can utilize the database to sort, group, and/or render the available chat groups based on the one or more predetermined criteria.

At step 1030, using the MID, the mobile user can select a chat group that the mobile user wishes to join, and the MID can send that selection to the chat server. Alternatively, using the MID, the mobile user can send a previously-determined identity of a chat group to the chat server.

Referring to the previous example, as a user approaches I-495 from I-66, the user can specify a desire to join the I-495-VA chat group. In some embodiments of the present invention, to assist that user in planning their I-495 travels, the user can access the I-495-VA chat group from their home computer. In other embodiments, however, this is only possible if their home computer is within a predefined distance and/or range of the chat server.

At step 1040, upon receipt of the user's selection or the chat group's identity, the chat server can connect the MID to the desired chat group, thereby either initiating a chat session or joining an on-going chat session. The chat server can assign a username dynamically to the user, or the user can have a pre-selected username.

At step 1050, the chat server can provide a chat message from the chat session to the MID, where the chat message can be rendered to the mobile user. As used herein, the term "render" means make perceptible, such as by, for example, displaying the chat message on a screen, playing the chat message over a speaker, and/or printing the chat message on a paper. Either the MID or the chat server can translate the message from one modality to another, such as from voice to text, and/or text to voice.

At step 1060, the mobile user can use the MID to compose a chat message, or receive chat messages composed on another information device, and send that chat message to the chat server for inclusion in the chat session. Either the MID or the chat server can translate the message from one modality to another, such as from voice to text, and/or text to voice. Once the message is received by the chat server, the chat server can provide that chat message to the information devices of other users, including other mobile users.

At step 1070, the MID can be transferred from one chat group to another. This can occur if the MID is heading out-of-range of a first chat server and, to provide continuity of the chat subject matter, the MID is transferred to a second chat server hosting and/or serving a chat group of an identical or closely related topic. Also, a MID can be transferred from a first chat group to a second chat group if the MID is heading out of a specified range for the first chat, group. For example, if a mobile user is turning off of I-495 onto I-66 Westbound, the MID can be transferred from the "I-495-VA" chat group to the "I-66-Fairfax County" chat group. Thus, group transfers and/or server transfers are possible.

Transfers can also occur if, although not out heading out of range, the mobile user selects and/or identifies a different second chat group to which to connect. In some situations, that second chat group can be hosted/served by the second chat server rather than the first chat server, and thus both a group transfer and a server transfer would be needed. Notably, in certain embodiments of the present invention, the mobile user, via the MID, can be connected to multiple chat groups simultaneously. The discussion of FIGS. 2 and 3 provides additional information about transfers.

At step 1080, the chat connection can be terminated, for any of a number of reasons. For example, the chat connection can be terminated at the request of the mobile user. As another example, the chat connection can be terminated at the request of the chat server, when it determines, for example, that the MID is out of range of the chat server. As yet another example, the chat connection can be terminated when an acknowledgment is not received to one or more signals after a specified waiting period. As a final example, the chat connection can be terminated by the chat server at the request of a system operator of the chat server.

Method 200

Figure 2:
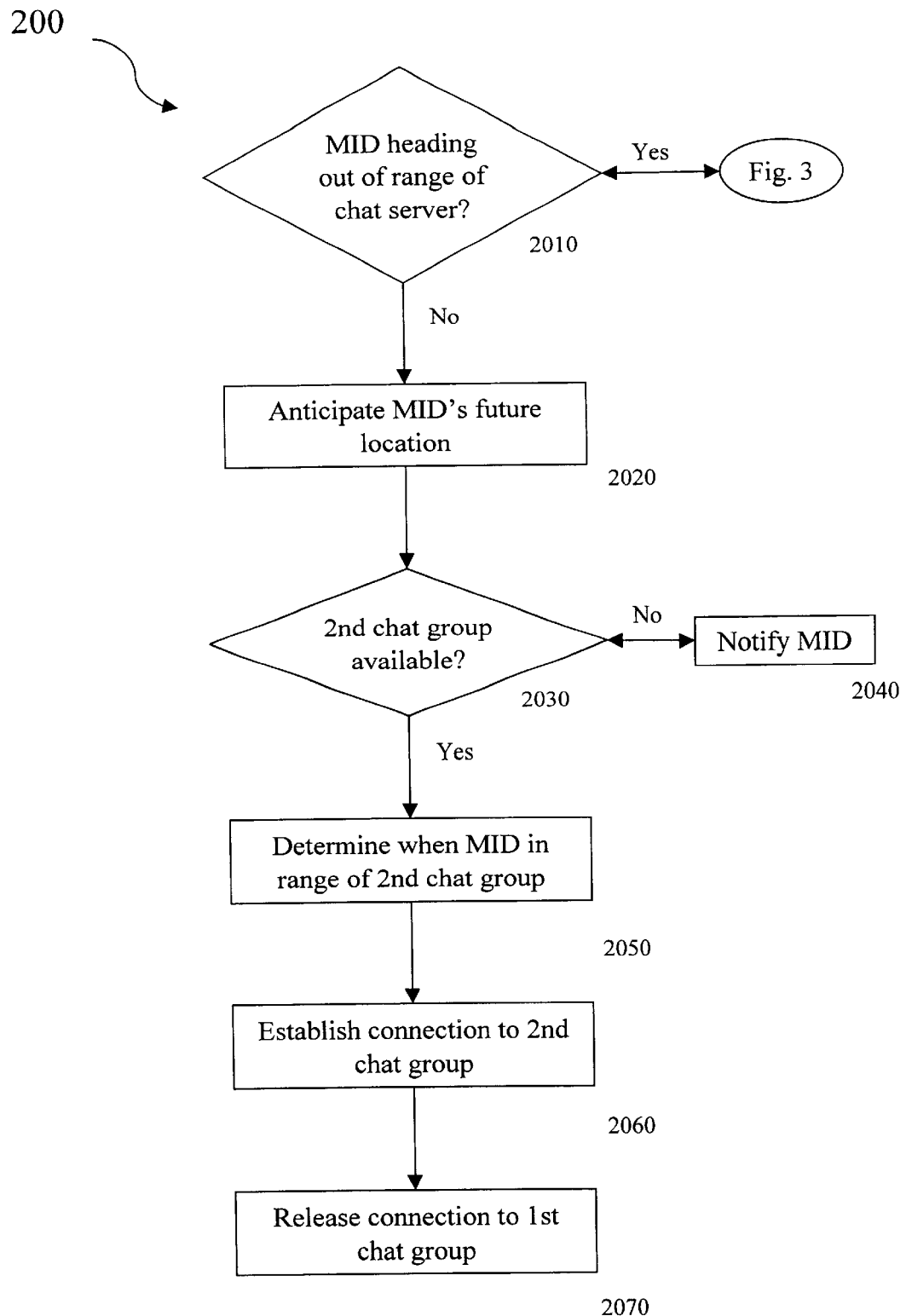
FIG. 2 is a flowchart of an exemplary embodiment of a method 200 of the present invention.
Figure 3:
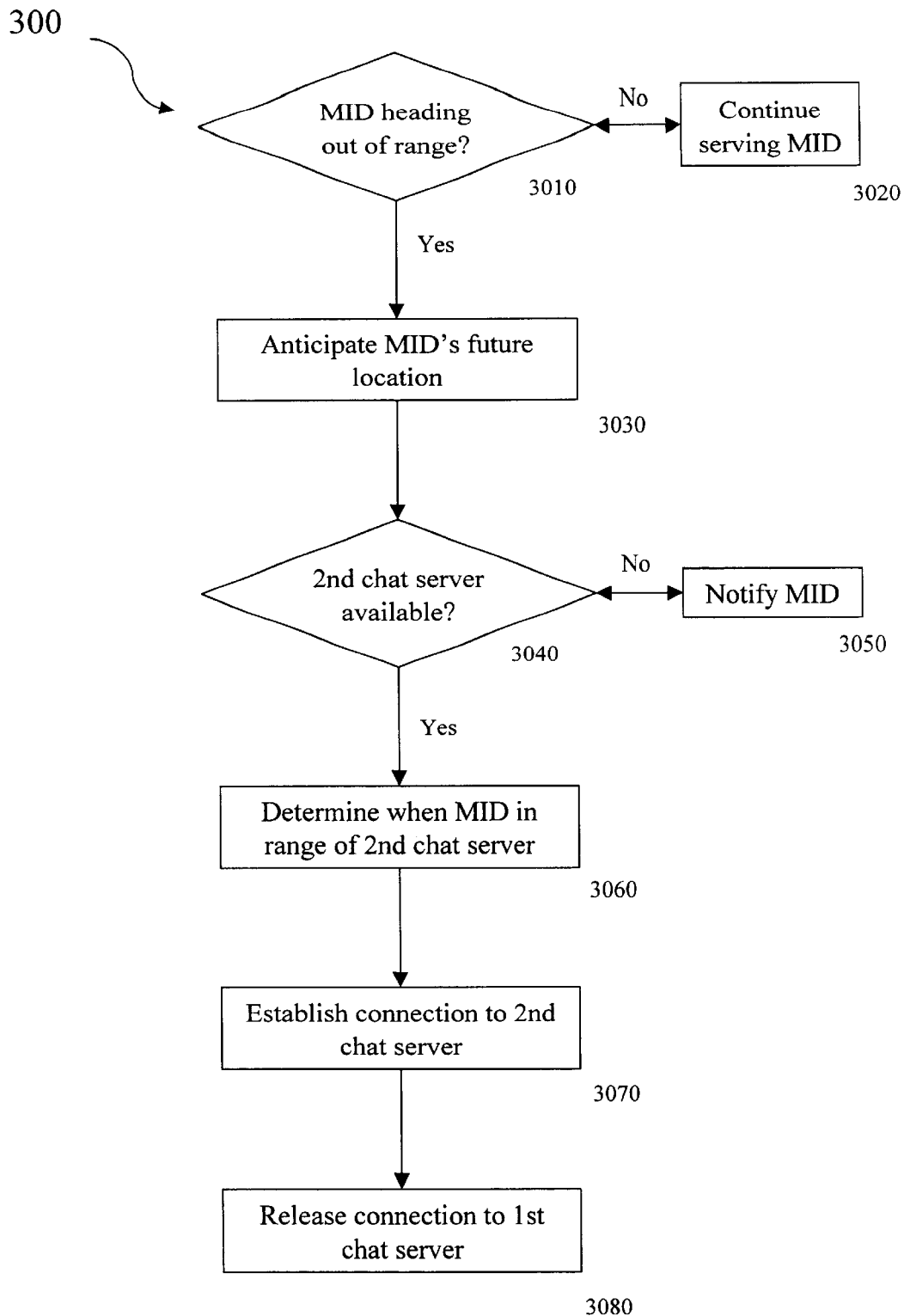
FIG. 3 is a flowchart of an exemplary embodiment of a method 300 of the present invention.

FIG. 2 is a flowchart of an exemplary embodiment of a method 200 of the present invention. Method 200 can begin at activity 2010, wherein a determination is made whether a MID is heading out-of-range of a chat server with which that MID has a connection. Such a determination can be accomplished using knowledge of the boundaries of the chat server's geographical range along with the present location, speed of movement, and/or direction of movement of the MID. Thus, this determination can be made by the MID, by the current chat server, or by any other information device in communication with the MID.

If the MID is heading out-of-range, then the method of FIG. 3 (described below) takes over. Otherwise, as shown at activity 2020, an anticipated location of the MID is determined for a time in the near future (such as in 10 seconds, 1 minute, 5 minutes, etc.). This determination can be accomplished using knowledge of the present location, speed of movement, and direction of movement of the MID. Thus, this determination can be made by, for example, the MID, by the current chat server, or by any other computing device. As another example, this determination can be made by a nearby chat server, using information sent to that server by the current chat server and/or the MID.

At activity 2030, a determination is made whether a second chat group is available. That determination can be made at the current chat server from information stored in a database associated with the current chat server, the database relating chat groups with their geographic boundaries and/or locations. The determination can also be made from the MID using information obtained from the chat server database.

At activity 2040, if a second chat group is unavailable, then a notification can be sent to and/or rendered on the MID for the user. Otherwise, at activity 2050, it can be determined when the MID is within the geographical area and/or range of the second chat group. This determination can be made by the MID or any chat server.

At activity 2060, the MID can be connected to the second chat group, and at activity 2070, the MID can be released from the first chat group. Alternatively, the MID can remain connected to both the first and second chat groups simultaneously.

Method 300

FIG. 3 is a flowchart of an exemplary embodiment of a method 300 of the present invention. Method 300 can begin at activity 3010, wherein a determination is made whether a MID is heading out-of-range of a chat server with which that MID has a connection. Such a determination can be accomplished using knowledge of the boundaries of the chat server's geographical range along with the present location, speed of movement, and/or direction of movement of the MID. Thus, this determination can be made by the MID, by the current chat server, or by any other information device in communication with the MID.

If the MID is not heading out-of-range, then at activity 3020, the chat server continues serving the MID. Otherwise, as shown at activity 3030, an anticipated location of the MID is determined for a time in the near future (such as in 10 seconds, 1 minute, 5 minutes, etc.). This determination can be accomplished using knowledge of the boundaries of the geographical ranges of other nearby chat servers, along with the present location, speed of movement, and direction of movement of the MID. Thus, this determination can be made by, for example, the MID, by the current chat server, or by any other computing device. As another example, this determination can be made by a nearby chat server, using information sent to that server by the current chat server and/or the MID.

At activity 3040, a determination is made whether a second chat server is available. That determination can be made at the current chat server from information stored in a database associated with the current chat server, the database relating chat servers with geographic boundaries and/or locations. The determination can also be made from the MID using a query signal designed to attract a response from any chat servers that receive it. The MID can determine the time delay associated with the response from each chat server from whom a response is received, and over time, determine if a second chat server is coming into range.

At activity 3050, if a second chat server is unavailable, then a notification can be sent to and/or rendered on the MID for the user. Otherwise, at activity 3060, it can be determined when the MID is within the geographical area and/or range of the second chat server. This determination can be made by the MID or any chat server.

At activity 3070, the MID can be connected to the second chat server, and at activity 3080, the MID can be released from the first chat server. Alternatively, the MID can remain connected to both the first and second chat servers simultaneously.

System 400

Figure 4:
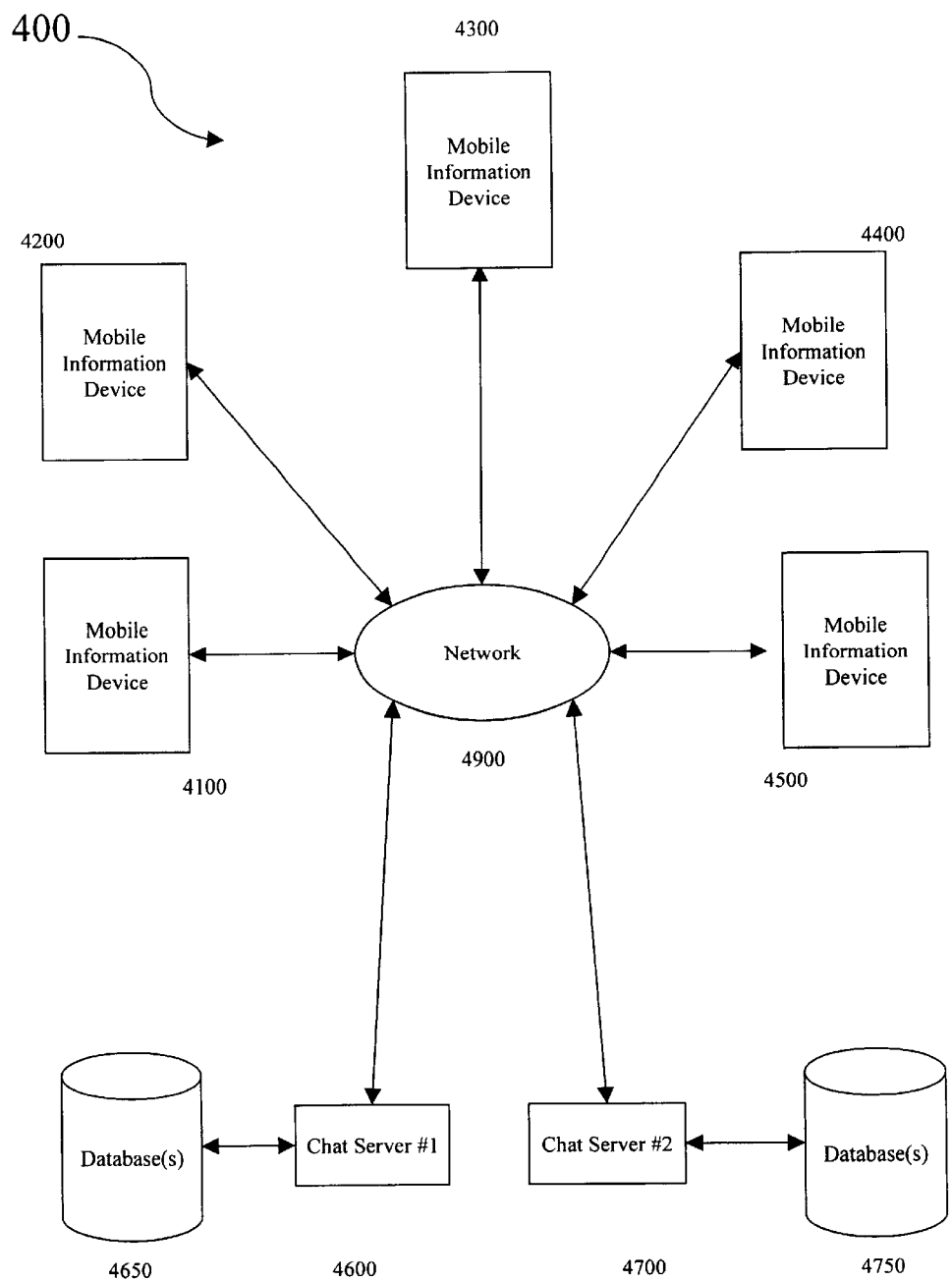
FIG. 4 is a block diagram of an exemplary embodiment of a system 400 of the present invention.

FIG. 4 is a block diagram of an embodiment of a system 400 of the present invention. As an initial matter, it suffices to say that, using the descriptions of methods 100, 200, and/or 300, one of ordinary skill in the art can implement the functionality of methods 100, 200, and/or 300 via system 400 utilizing any of a wide variety of well-known architectures, hardware, protocols, and software. Thus, the following description of system 400 can be viewed as illustrative, and should not be construed to limit the implementation of methods 100, 200, and/or 300.

Within system 400, a MID 4100 can be used, for example, to communicate with other MID's 4200–4500 via a chat server 4600, 4700. MID 4100 can also be used, for example, to initiate a connection with a chat server, provide a location beacon or message, select a chat group, receive chat messages, provide chat messages, and/or release a connection with a chat server.

Each MID 4100–4500 can be connected to network 4900. Also connected to network 4900 can be chat servers 4600, 4700. Any chat server 4600, 4700, can be connected to one or more databases 4650, 4750, and can function as a server of the one or more connected databases and/or software applications (not shown).

Chat server 4600 can be used to host one or more chat groups, to detect a MID in a geographic area of chat server 4600, to offer chat groups to the MID, to receive a chat group selection from the MID, to connect the MID to a selected chat group, to provide chat messages to the MID, to receive chat messages from the MID, to translate chat messages from one modality to another, to transfer a MID from one chat group to another, to transfer a MID from one chat server to another, and/or to transfer a chat session with a MID to another chat server. Chat server 4600 also can be used to host one or more databases 4650, host chat and/or communication software, host web sites, serve files, serve e-mail, etc. Chat server 4600 can be a computing device of any sort.

Network 4900 can electronically link MID's 4100–4500 and chat servers 4600, 4700, so that information can be transmitted and/or exchanged there between. Network 4900 can have any architecture, including a direct connection, a local area network, a wide area network such as the public switched telephone network and/or the Internet, an extranet, and/or a combination thereof, so long a portion of network 4900 can provide connectivity to a MID 4100–4500. Thus, at least a portion of network 4900 can be a packet-switched, a circuit-switched, a connectionless, or connection-oriented network or interconnected networks, or any combination thereof. Network 4900 can be oriented toward voice and/or data communications. Moreover, a transmission media of network 4900 can take any form, including wireline, satellite, wireless, or any combination thereof, so long a portion of network 4900 can provide connectivity to a MID 4100–4500. In certain embodiments, the transmission media of network 4900 can be limited to those that support the secure transmission of data.

From a hardware standpoint, any MID 4100–4500, can be, for example, a wireless information device, such as a telephone, cellular telephone, personal computer, workstation, personal information manager, personal digital assistant, handheld computer, data terminal, or other similar device connectable to a network in a wireless manner.

Similarly, any chat server 4600, 4700 can be, for example, a personal computer, workstation, mini-computer, mainframe computer, personal information manager, personal digital assistant, handheld computer, data terminal, or other similar device. Chat server 4600, 4700 can connect to network 4900 in a wired or wireless manner.

Device 500

Figure 5:
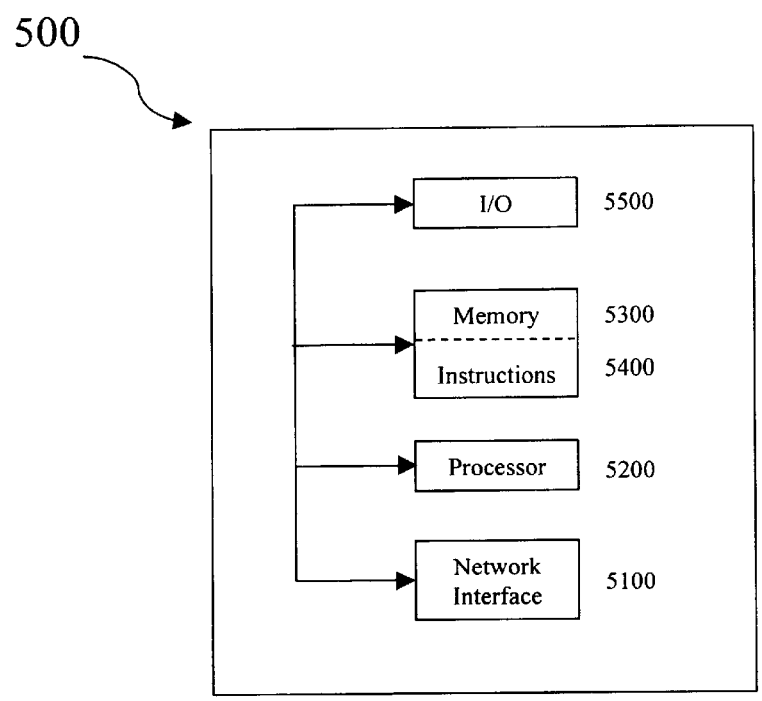
FIG. 5 is a block diagram of an exemplary embodiment of an information device 500 the present invention.

FIG. 5 is a block diagram of a typical information device 500, which can symbolize any MID 4100–4500, and/or server 4600, 4700. Information device 500 can include well-known components such as one or more network interfaces 5100, one or more processors 5200, one or more memories 5300 containing instructions 5400, and/or one or more input/output ("I/O") devices 5350.

In at least one embodiment, when used with a wireless device, network interface 5100 can be a wireless telephone, a wireless transceiver, a wireless modem, and/or other similar devices.

In another embodiment, when used with a wired device, network interface 5100 can be a data modem, a cable modem, a digital subscriber line interface, a bridge, a hub, a router, or other similar devices.

In at least one embodiment, processor 5200 can be a general-purpose microprocessor, such the Pentium series microprocessor manufactured by the Intel Corporation of Santa Clara, Calif. In another embodiment, the processor can be an Application Specific Integrated Circuit (ASIC), which has been designed to implement in its hardware and/or firmware at least a part of a method in accordance with an embodiment of the present invention.

In at least one embodiment, memory 5300 can be coupled to a processor 5200 and can store instructions 5400 adapted to be executed by processor 5200 according to one or more activities of methods 100, 200, and/or 300. Memory 5300 can be any device capable of storing analog or digital information, such as a hard disk, Random Access Memory (RAM), Read Only Memory (ROM), flash memory, a compact disk, a magnetic tape, a floppy disk, and any combination thereof.

In at least one embodiment, instructions 5400 can be embodied in software, which can take any of numerous forms that are well known in the art. For example, instructions 5400 can be embodied in one or more databases having a flat file or a relational organization, and a centralized or distributed architecture. For instance, those of skill in the art can tailor products such as an SQL database to provide the functionality of method 100, method 200, method 300, and/or system 400. One supplier of such database products is Oracle Corporation, of Redwood Shores, Calif. Moreover, software standards and protocols such as EDI, FTP, HTTP, HTTPS, HTML, XML, cXML, XSL, SSL and WAP can be utilized for communications between information devices. Additionally, instructions 5400 can be embodied in one or more platform-independent and/or network-centric software tools such as, for example, CGI, Java, or JavaScript.

In at least one embodiment, I/O device 5500 can be an audio and/or visual device, including, for example, a monitor, display, keyboard, keypad, touch-pad, pointing device, microphone, speaker, video camera, camera, scanner, and/or printer, including a port to which an I/O device can be attached or connected.

Thus, the present invention advantageously provides numerous methods for location-based chat sessions. Such chat sessions can allow, for example, drivers to inform each other about traffic conditions, shoppers to notify each other about sales, and/or visitors to ask questions about displays in museums. Still other advantages of the present invention will become readily apparent to those skilled in this art from the above-recited detailed description. Accordingly, the drawings and descriptions are to be regarded as illustrative in nature, and not as restrictive.

For example, an alternative embodiment of the method and/or system of the present invention allows chat groups to be formed dynamically. In this embodiment, each user specifies criteria for creating and/or joining a group. For example, a user can specify that they would be willing to join a group of other users located within 5 miles of them. In this case, messages from the user are only received by others who meet this criterion, and the user only receives messages from others who meet this criterion.

What is claimed is:

1. A method for transferring a chat session involving a mobile-information device from a first chat server to a second chat server, comprising the activities of:
   receiving at the second chat server a transfer request, the transfer request not sent by a user of the mobile information device;
   establishing connectivity between the mobile information device and the second chat server;
   releasing connectivity between the mobile information device and the first chat server.

2. The method of claim 1, further comprising:
   identifying chat servers within a predetermined geographic proximity to the first chat server.

3. The method of claim 1, further comprising:
   selecting the second chat server.

4. The method of claim 1, further comprising:
   determining a location of the second chat server.

5. The method of claim 1, further comprising:
   determining an identification of the second chat server.

6. The method of claim 1, further comprising:
   identifying available chat groups of the second chat server.

7. The method of claim 1, further comprising:
   selecting a second chat group of the second chat server to relate to a first chat group of the first chat server.

8. The method of claim 1, further comprising:
   relating a first chat group of the first chat server to a second chat group of the second chat server.

9. The method of claim 1, further comprising:
   determining whether the transfer request should be transmitted.

10. The method of claim 1, further comprising:
    determining when the transfer request should be transmitted.

11. A computer-readable medium storing instructions that, when executed by one or more processors, cause the one or more processors to perform activities comprising:
    receiving at the second chat server a transfer request, the transfer request not sent by a user of the mobile information device;
    establishing connectivity between the mobile information device and the second chat server;
    releasing connectivity between the mobile information device and the first chat server.

12. An apparatus for transferring a chat session involving a mobile information device from a first chat server to a second chat server, comprising:
    means for receiving at the second chat server a transfer request, the transfer request not sent by a user of the mobile information device;
    means for establishing connectivity between the mobile information device and the second chat server;
    means for releasing connectivity between the mobile information device and the first chat server.

13. A method for transferring a mobile information device from a first chat group to a second chat group, comprising the activities of:
    determining a need to transfer a mobile information device from a first chat group to a second chat group, said determining not performed by a user of the mobile information device;

identifying a second chat group to which to transfer the mobile information device;

coupling the mobile information device to the second chat group; and de-coupling the mobile information device from the first chat group.

14. The method of claim 13, wherein the need to transfer is determined by a user of the mobile information device.

15. The method of claim 13, wherein the need to transfer is determined by the mobile information device.

16. The method of claim 13, wherein the need to transfer is determined by a chat server.

17. The method of claim 13, wherein the need to transfer is determined by a chat server on which the first chat group is hosted.

18. The method of claim 13, wherein the need to transfer is determined by a chat server on which the second chat group is hosted.

19. The method of claim 13, wherein the activity of identifying a second chat group is performed by the mobile information device.

20. The method of claim 13, wherein the activity of identifying a second chat group is performed by a user of the mobile information device.

21. The method of claim 13, wherein the activity of identifying a second chat group is performed by a chat server.

22. The method of claim 13, wherein the activity of identifying a second chat group is performed by a chat server on which the first chat group is hosted.

23. The method of claim 13, wherein the activity of identifying a second chat group is performed by a chat server on which the second chat group is hosted.

24. The method of claim 13, wherein the first chat group and the second chat group are hosted by a common chat server.

25. The method of claim 13, wherein the second chat group is hosted by a different chat server than the first chat group.

26. A computer-readable medium storing instructions that, when executed by one or more processors, cause the one or more processors to perform activities comprising:

determining a need to transfer a mobile information device from a first chat group to a second chat group, said determining not performed by a user of the mobile information device;

identifying a second chat group to which to transfer the mobile information device;

coupling the mobile information device to the second chat group; and de-coupling the mobile information device from the first chat group.

27. An apparatus for transferring a mobile information device from a first chat group to a second chat group, comprising:

means for determining a need to transfer a mobile information device from a first chat group to a second chat group, said determining not performed by a user of the mobile information device;

means for identifying a second chat group to which to transfer the mobile information device;

means for coupling the mobile information device to the second chat group; and means for de-coupling the mobile information device from the first chat group.

* * * * *